United States Patent [19]

Mochida et al.

[11] Patent Number: 4,556,543
[45] Date of Patent: Dec. 3, 1985

[54] CERAMIC HONEYCOMB CATALYTIC CONVERTERS HAVING HIGH THERMAL SHOCK RESISTANCE

[75] Inventors: Shigeru Mochida, Kasugai; Masaru Kojima; Jun Kitagawa, both of Nagoya, all of Japan

[73] Assignee: NGK Insulators, Ltd., Japan

[21] Appl. No.: 517,386

[22] Filed: Jul. 27, 1983

Related U.S. Application Data

[63] Continuation of Ser. No. 284,589, Jul. 17, 1981, abandoned.

[30] Foreign Application Priority Data

Jul. 24, 1980 [JP] Japan ................................. 55-100484

[51] Int. Cl.[4] .......................... F01N 3/22; F01N 3/28; F01N 7/16
[52] U.S. Cl. ...................... 422/171; 60/299; 422/179; 422/180; 422/221; 422/222
[58] Field of Search ............... 422/171, 179, 180, 221, 422/222; 60/299

[56] References Cited

U.S. PATENT DOCUMENTS

| | | | |
|---|---|---|---|
| 3,397,154 | 8/1968 | Talsma | 60/299 |
| 3,441,381 | 4/1969 | Keith et al. | 422/180 |
| 3,785,781 | 1/1974 | Hervert et al. | 60/299 |
| 3,828,736 | 8/1974 | Koch | 60/299 |
| 3,967,929 | 7/1976 | Tamazawa et al. | 60/299 |
| 4,021,203 | 5/1977 | Givens et al. | 422/171 |
| 4,072,007 | 2/1978 | Sanday | 422/171 |
| 4,134,733 | 1/1979 | Volker et al. | 422/180 |
| 4,348,360 | 9/1982 | Chang et al. | 422/180 |
| 4,416,674 | 11/1983 | McMahon et al. | 422/171 X |

*Primary Examiner*—Barry S. Richman
*Assistant Examiner*—Brion P. Heaney
*Attorney, Agent, or Firm*—Parkhurst & Oliff

[57] ABSTRACT

A heat resistant and thermal shock resistant ceramic honeycomb catalytic converter for purifying automotive exhaust gas and the like is constructed by arranging at least one ceramic honeycomb structural body, having a dimension of $$0.10 \leq L/D \leq 0.40$$

wherein L and D are respectively a length and a diameter of the ceramic honeycomb structural body, upstream of and adjacent to another ceramic honeycomb structural body in a metal casing.

6 Claims, 5 Drawing Figures

CERAMIC HONEYCOMB CATALYTIC CONVERTERS HAVING HIGH THERMAL SHOCK RESISTANCE

This is a continuation of application Ser. No. 284,589 filed July 17, 1981, now abandoned.

The present invention relates to a ceramic honeycomb catalytic converter to be used for purifying automotive exhaust gas and more particularly to a ceramic honeycomb catalytic converter having excellent heat resistance and thermal shock resistance.

A ceramic honeycomb catalytic converter consists mainly of a ceramic honeycomb structural body provided with a large number of parallel channels separated by thin walls and stimulates a catalytic reaction while allowing a fluid having high temperatures to flow through the channels, and has been broadly used for purifying automotive exhaust gas because of low pressure loss, large geometric surface area and light weight.

In particular, a ceramic honeycomb catalytic converter to be used for automobiles has passed through it an exhaust gas at high temperatures and is subjected to thermal shock due to rapid heating and quenching. The ceramic honeycomb structural body in said converter must be composed of a material having excellent properties of both heat resistance and thermal shock resistance and hence, cordierite ceramic honeycomb structural bodies have been broadly used. However, even in the ceramic honeycomb structural bodies made of the above described material, said structural bodies may be melted and damaged owing to the exhaust gas having abnormally high temperatures or may be broken due to severe thermal shock of rapid heating and quenching. For these reasons, ceramic honeycomb structural bodies having excellent properties in both heat resistance and thermal shock resistance have been demanded.

Recently, the regulation of exhaust gas has become more severe, so that a purifying system wherein the purifying ability is more improved by providing a ceramic honeycomb catalytic converter near an engine has been developed, but in this case the temperature of exhaust gas becomes high, and therefore the melting and damaging problem occurs and ceramic honeycomb structural bodies having more excellent heat resistance which are hardly melted and damaged, have been increasingly demanded.

Various ceramic materials which are more excellent in heat resistance than cordierite are known, for example, alumina, mullite, zirconia, zircon, spinel, alumina titanate, silicon carbide, silicon nitride and materials composed of some of these materials. For example, the melting point of silicon carbide, alumina, silicon nitride and mullite is 2,700° C., 2,030° C., 1,900° C. and 1,810° C. respectively, while the melting point of cordierite is 1,470° C. and the former materials are excellent in the heat resistance. However, ceramic honeycomb structural bodies made of these materials are extremely lower than cordierite in thermal shock resistance, causing practical problems.

The present invention relates to a ceramic honeycomb catalytic converter in which the weakness in thermal shock resistance of a ceramic honeycomb catalytic converter, consisting of a ceramic honeycomb structural body composed of a material which is excellent in heat resistance but poor in thermal shock resistance, is improved to a high level. The present invention consists of a ceramic honeycomb catalytic converter consisting of a ceramic honeycomb structural body having a large number of parallel channels separated by thin walls and at least one other ceramic honeycomb structural body arranged at the upstream end of the gas flow in the housing. The upstream ceramic honeycomb body has the dimensions of $0.10 \leq L/D \leq 0.40$, preferably $0.10 \leq L/D \leq 0.30$ wherein L and D are the length and diameter of the upstream ceramic honeycomb structural body, respectively.

The present invention is based on the results of the following experiment concerning the thermal shock resistance of ceramic honeycomb structural bodies, one of which is knowledge concerning the state in which a ceramic honeycomb structural body fails owing to thermal shock when a ceramic honeycomb catalytic converter is practically used and another of which is an experimental fact regarding the dependency of the thermal shock resistance of a ceramic honeycomb structural body on its size and shape. In general, the flow of the exhaust gas in a ceramic honeycomb structural body in a ceramic honeycomb catalytic converter is uneven and a larger amount of exhaust gas flows through the central portion of the ceramic structural body. Therefore, the temperature at the central portion tends to become higher while the circumferential portion is cooled by ambient air and maintained at a lower temperature. Thus, a temperature gradient is produced in the cross-section of the ceramic honeycomb structural body and a thermal stress is generated. Also, a compression stress and a tensile stress are generated at the central portion and the circumferential portion, respectively.

In general, ceramic is strong against compression stress but is weak against tensile stress, so that it has been well known that the tensile stress generated by the above described temperature gradient causes failure of the ceramic honeycomb structural body and said body is broken at the circumferential portion.

The inventors examined the position where the failure of a ceramic honeycomb structural body started along the longitudinal direction at the above mentioned circumferential portion. FIG. 1 illustrates a prior ceramic honeycomb catalytic converter comprising a metal casing 1 having a cylindrical portion 2, an inlet portion 3 and an outlet portion 4. A catalyst-carrying cylindrical ceramic honeycomb structural body 5 is held by an annular circumferential member 7 positioned inside the casing 1 and end supporting members 8 are pressed against the peripheral edge portions of both end surfaces 5' of ceramic body 5. In the prior art ceramic honeycomb catalytic converter the inventors found that the failure position is near the upstream portion of the ceramic body. In the above described ceramic honeycomb structural body 5 with a total length L, it was found that the circumferential position is point "a" in FIG. 1 where the distance from the upstream gas is L/8. This observation is also confirmed in FIG. 2 which was obtained by measuring the temperature distribution of the ceramic honeycomb structural body along the longitudinal direction and shows the temperature at each point A–D and a–d in FIG. 1 10 seconds after the high temperature exhaust gas flowed into said converter. FIG. 2 illustrates that the temperature difference between the central portion A and the outer surface portion "a" is largest among the other points and therefore this point was the most highly thermally stressed and presumably became the starting point of breakage. These results suggested that the position of the ceramic honeycomb structural body at the upstream portion of the converter undergoes the most severe thermal shock and at the downstream portion of the converter is subjected to only a relatively low thermal shock. Thus, if a ceramic honeycomb structural body having high thermal shock resistance is used at the upstream portion of the converter even when a ceramic honeycomb structural body having relatively poor thermal shock resistance is used downstream thereof, thermal shock failure scarcely occurs.

The results of an experiment on the effect of the size of a ceramic honeycomb structural body upon thermal shock resistance is shown in FIG. 3. In FIG. 3, the ordinate shows the thermal shock resistance obtained in the test method disclosed in the example hereinafter mentioned using a ceramic honeycomb catalytic converter shown in FIG. 1, and the abscissa shows a ratio (L/D) of the length (L) of the ceramic honeycomb structural body housed in the above described catalytic converter to the diameter (D) thereof. It has been well known that the thermal shock resistance is generally improved as the size of the sample decreases. However, the thermal shock resistance of the ceramic honeycomb structural body is not so influenced by the size of the sample, particularly the diameter D, but is greatly varied by the L/D ratio when the said body undergoes thermal shock by high temperature exhaust gas passing through said body, and the thermal shock resistance is noticeably improved when the value is smaller. The thermal shock resistance is high in ranges of L/D smaller than 0.5, 0.10–0.40, and particularly 0.10–0.30. When L/D is less than 0.10, the length of the honeycomb structural body is too small to purify the exhaust gas and such a value is not practical. Furthermore, it has been found that even if the material is varied, the same effect is obtainable.

The present invention will be explained in more detail.

For better understanding of the invention, reference is taken to the accompanying drawings, wherein.

Figure 1:
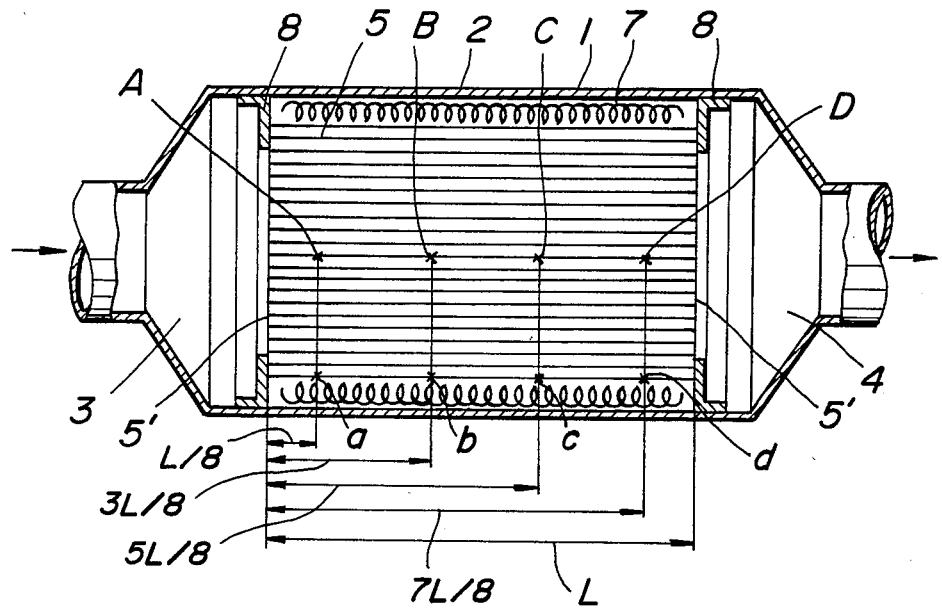
FIG. 1 is a cross-sectional view of a conventional ceramic honeycomb catalytic converter.
Figure 2:
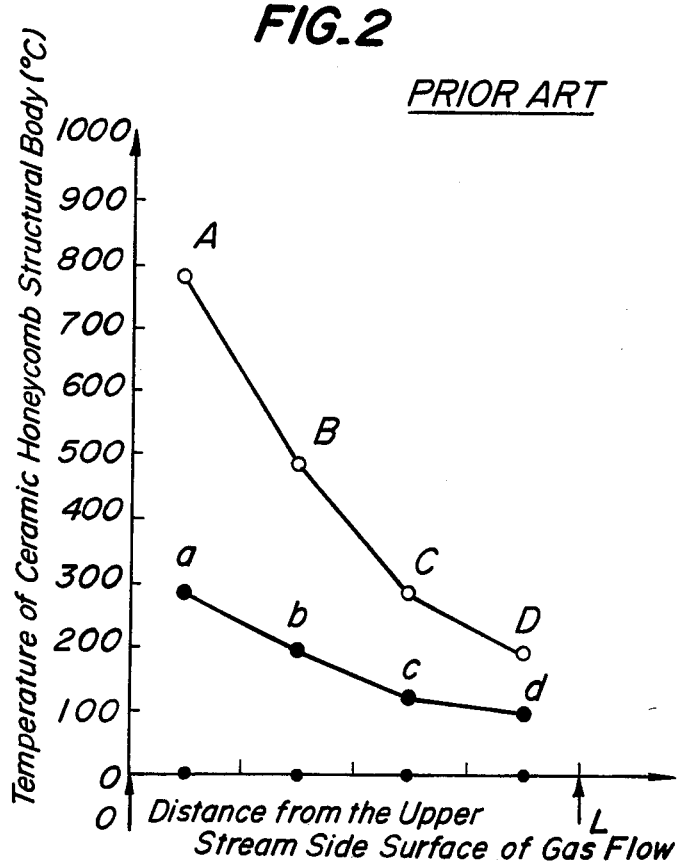
FIG. 2 is a graph showing the temperature distribution of the ceramic honeycomb structural body shown in FIG. 1.
Figure 3:
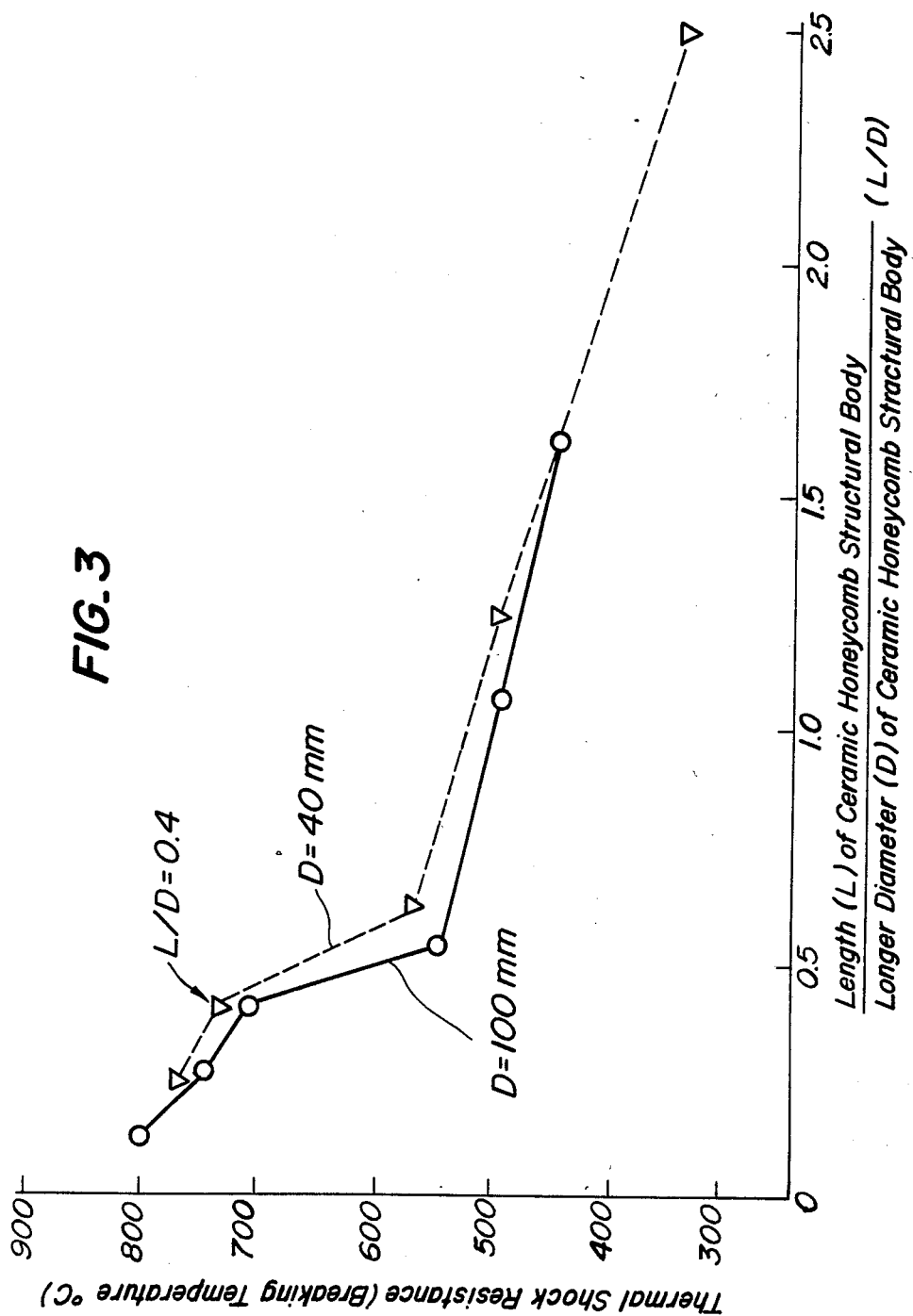
FIG. 3 is a graph showing the thermal shock resistance of ceramic honeycomb structural bodies having diameters of 40 mm and 100 mm and various lengths.
Figure 4:
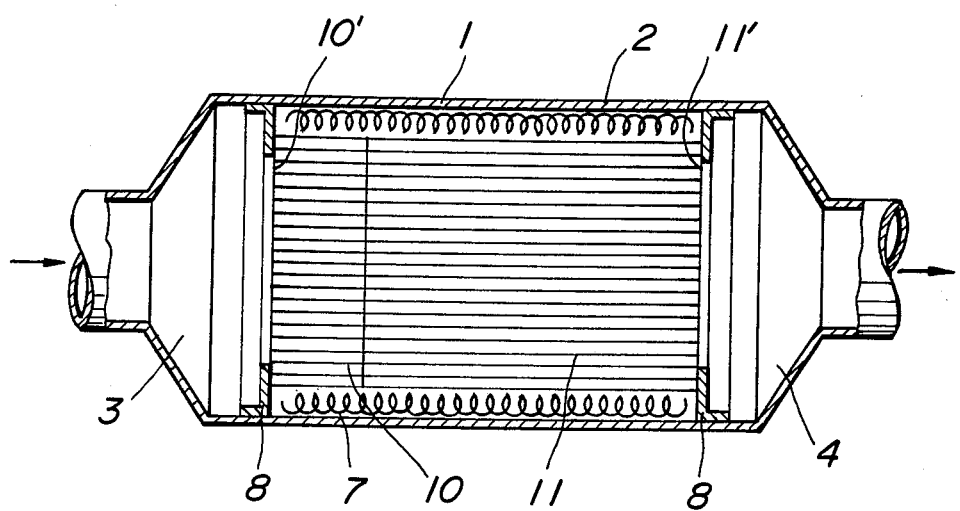
FIGS. 4 and 5 are cross-sectional views of examples of the present invention.

FIG. 4 shows an example of a ceramic honeycomb catalytic converter of the present invention. In a metal casing 1 an inlet portion 3 and an outlet portion 4 for an exhaust gas are arranged in front of and behind a cylindrical portion 2. Catalyst-carrying cylindrical ceramic honeycomb structural bodies 10 and 11 are adjacently arranged in the longitudinal direction of said bodies and held by annular circumferential members 7 inside the casing 1 and end supporting members 8 are pressed against the peripheral portion end surfaces 10' and 11' of the ceramic honeycomb structural bodies 10 and 11, respectively. The above described ceramic honeycomb structural body 10 is arranged adjacent the inlet portion 3 and its L/D/ ratio is 0.10–0.40. The combined length of the above described ceramic honeycomb structural bodies 10 and 11 should be approximately the same as the usual length of a ceramic honeycomb structural body used in the conventional ceramic honeycomb catalytic converter.

As easily understood from the above described experimental results and construction of the present invention, the resistance of the above described ceramic honeycomb structural bodies 10 and 11 against thermal shock is far superior to that of conventional ceramic honeycomb structural bodies. That is, the ceramic honeycomb structural body 10 has L/D of 0.10–0.40, so that the thermal shock resistance is far more excellent than that of the conventional ceramic honeycomb structural bodies having larger values of L/D, and the ceramic honeycomb structural body 11 is arranged downstream from the ceramic honeycomb structural body 10, so that the thermal shock caused by the exhaust gas is moderated and therefore the overall thermal shock resistance is correlatively improved.

The present invention consists of the ceramic honeycomb catalytic converter using such ceramic honeycomb structural bodies and therefore thermal shock resistance is far more improved than that of the conventional catalytic converters. Accordingly, in the present invention, even with ceramic honeycomb structural bodies using the above described materials which are excellent in heat resistance but poor in thermal shock resistance, the resistance against breakage due to thermal shock is satisfactorily high, so that ceramic honeycomb catalytic converters having excellent heat resistance and thermal shock resistance can be provided.

Figure 5:
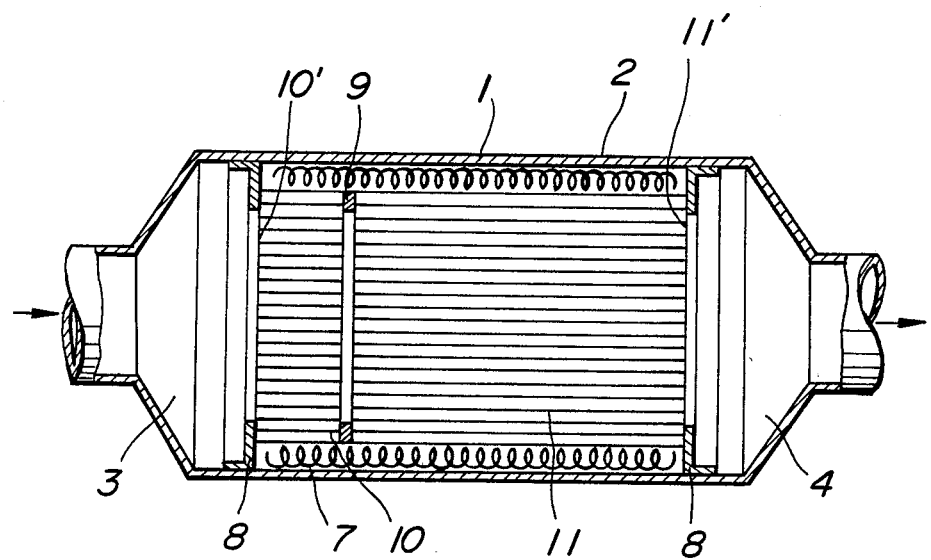

The above description shows the ceramic honeycomb catalytic converter wherein the ceramic honeycomb structural bodies 10 and 11 are arranged in contact, but the object of the present invention can also be attained with the construction as shown in FIG. 5 wherein the ceramic honeycomb structural bodies 10 and 11 are arranged apart, and in this case an elastic ring-shaped member 9 is provided between both bodies as a spacer.

Furthermore, the above described ceramic honeycomb structural bodies 10 and 11 may be of the same material or of different materials, and they may be properly selected depending upon the using conditions of the ceramic honeycomb catalytic converter, particularly upon the composition and the thermal conditions of the exhaust gas. The above described examples are constructed with the ceramic honeycomb structural bodies 10 and 11, but the present invention is not limited to converters constructed with two ceramic honeycomb structural bodies and includes constructions which are composed of a plurality of, for example, three or four ceramic honeycomb structural bodies.

In the above decription, the embodiments wherein the ceramic honeycomb structural bodies 10 and 11 and the casing 1 have circular cross-section are shown, but they may be oval and the like. In this case, the minimum diameter D may be chosen from the normal cross-sectional value of the ceramic honeycomb structural body; for example, in an oval shape, the short diameter is adopted.

The following examples are given for the purpose of illustration of this invention and are not intended as limitations thereof.

EXAMPLES

Using ceramic honeycomb catalytic converters wherein ceramic honeycomb structural bodies 10 and 11 having a diameter of 100 mm were arranged in a total length of 100 mm as shown in FIG. 4, the thermal shock resistance was tested and the obtained results are shown in the following Table 1.

TABLE 1

| Ceramic honeycomb materials | Length of ceramic honeycomb (mm) | | Breaking temperature due to thermal shock* (°C.) |
|---|---|---|---|
| | upstream side | downstream side | |
| Present invention Mullite | 10 | 90 | 700 |
| | 20 | 80 | 725 |
| | 30 | 70 | 650 |
| | 40 | 60 | 500 |
| Conventional | 100 | — | 425 |
| Present invention Silicon nitride | 10 | 90 | 950 |
| | 20 | 80 | 1,025 |
| | 30 | 70 | 900 |
| | 40 | 60 | 725 |
| Conventional | 100 | — | 600 |

*In this example, the temperature determination was made when either honeycomb body was broken.

The method for testing the thermal shock resistance is as follows.

Combustion gas at the given temperature and hot air at a constant temperature of about 100° C. were alternately sent into the above described ceramic honeycomb catalytic converter for 5 minutes respectively. This cycle was repeated 20 times and then the ceramic honeycomb structural body taken out from the above described ceramic honeycomb catalytic converter was observed and the breakage was checked. When the ceramic honeycomb structural body was not broken, the temperature of the combustion gas was further raised 25° C. and the same test was carried out and repeated until breakage occured and the breaking temperature was determined.

As seen from these results, the thermal shock resistance of the ceramic honeycomb catalytic converters of the present invention is noticeably improved as compared with that of the conventional converter, and in the ceramic honeycomb catalytic converters wherein the ceramic honeycomb structural bodies 10 and 11 having moderate lengths respectively are used, the breaking temperature is increased by about 70%. Thus, ceramic honeycomb catalytic converters having high thermal shock resistance can be obtained.

As mentioned above, the ceramic honeycomb catalytic converters according to the present invention have very high thermal shock resistance and use ceramic honeycomb structural bodies using materials which have been heretofore difficult to use practically. Thus ceramic honeycomb catalytic converters having excellent heat resistance and thermal shock resistance can be provided and therefore the present invention is commercially very advantageous.

What is claimed is:

1. A thermal shock resistant ceramic honeycomb catalytic converter having a plurality of catalytic, serially disposed ceramic honeycomb structural bodies with a large number of parallel channels separated by thin walls, said plurality of bodies being positioned in a catalytic converter chamber such that at least one heat resistant ceramic honeycomb structural body selected from the group consisting of alumina, mullite, zirconia, zircon, spinel, alumina titanate, silicon carbide and silicon nitride, having a dimension $$0.10 \leq L/D \leq 0.40$$

wherein L and D are a length and a diameter of the ceramic honeycomb structural body, respectively, is located upstream of all the remaining ceramic honeycomb structural bodies and imparts increased thermal shock resistance to the catalytic converter.

2. The thermal shock resistant ceramic honeycomb catalytic converter as claimed in claim 1, wherein the upstream ceramic honeycomb structural body abuts against the adjacent ceramic honeycomb structural body.

3. The thermal shock resistant ceramic honeycomb catalytic converter as claimed in claim 1, wherein the upstream ceramic honeycomb structural body has the dimension of $0.10 \leq L/D \leq 0.30$.

4. The thermal shock resistant ceramic honeycomb catalytic converter as claimed in claim 3, wherein the upstream ceramic honeycomb structural body abuts against the adjacent ceramic honeycomb structural body.

5. The thermal shock resistant ceramic honeycomb catalytic converter as claimed in claim 1, having only two ceramic honeycomb structural bodies.

6. The thermal shock resistant ceramic honeycomb catalytic converter as claimed in claim 5, wherein a ratio of a length of said upstream structural body to a length of the other structural body is 10:90.

* * * * *